United States Patent [19]
Kunsagi

[11] 3,714,970
[45] Feb. 6, 1973

[54] LARGE DUCTS
[75] Inventor: Laszlo Kunsagi, New York, N.Y.
[73] Assignee: Foster Wheeler Corporation, Livingston, N.Y.
[22] Filed: May 26, 1971
[21] Appl. No.: 147,259

Related U.S. Application Data
[63] Continuation of Ser. No. 850,541, Aug. 14, 1969, abandoned.

[52] U.S. Cl. .................138/109, 138/171, 138/172
[51] Int. Cl. ..................................................F16l 9/04
[58] Field of Search......138/100, 109, 121, 156, 157, 138/170, 171, 172, 173, 177, 178, DIG. 4, DIG. 11, DIG. 5, 39; 285/183, 177, 424; 415/56, 217, 185, 202; 220/5 A; 222/460, 462; 239/594, 595

[56] References Cited

UNITED STATES PATENTS

| | | |
|---|---|---|
| 58,648 | 10/1866 | Joy ......................................220/5 A |
| 192,310 | 6/1877 | Tippett................................220/5 A |
| 312,875 | 2/1885 | Marshall..............................220/5 A |
| 308,825 | 12/1884 | Butz ................................138/173 X |
| 239,514 | 3/1881 | Leadley............................138/173 X |
| 1,921,056 | 8/1933 | Walker............................138/DIG. 4 |
| 2,180,644 | 11/1939 | Peck................................138/DIG. 4 |
| 2,215,318 | 9/1940 | Bristol.............................138/DIG. 4 |
| 2,216,864 | 10/1940 | Wasmund........................138/DIG. 4 |

FOREIGN PATENTS OR APPLICATIONS 301,099  8/1954  Switzerland..........................138/177

Primary Examiner—Carlton R. Croyle
Assistant Examiner—Richard Sher
Attorney—John E. Wilson, John Maier, III and Marvin A. Naigur

[57] ABSTRACT

Large fluid ducts made up of plates require little or no reinforcement, are relatively free of vibration and create comparatively little resistance to fluid flow. The plates are bowed to reinforce them against vibration and thereby obviate or reduce the use of reinforcing members.

1 Claim, 5 Drawing Figures

INVENTOR.
LASZLO KUNSAGI
BY
John E. Wilson
JOHN E. WILSON
ATTORNEY

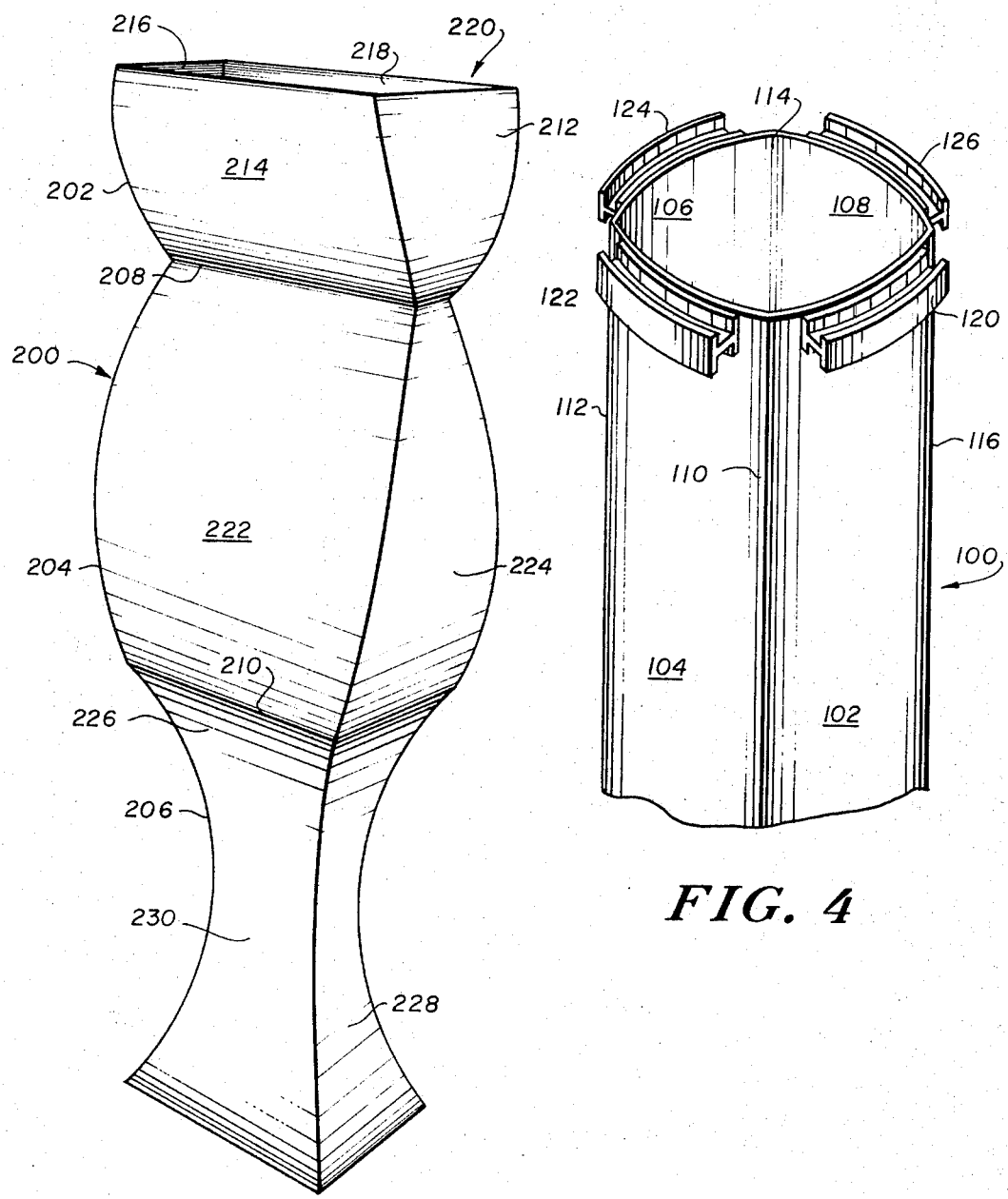

LARGE DUCTS

CROSS-REFERENCE TO RELATED APPLICATION

The present application is a continuation of application, Ser. No. 850,541, filed Aug. 14, 1969, now abandoned.

BACKGROUND OF THE INVENTION

Most large ducts such as those used in large power plants are generally fabricated in the field out of large flat metal plates. This is so because in such installations, it is impractical to use pre-fabricated ducts because their enormous size does not permit them to be shipped.

Large ducts which are made of flat plates have several disadvantages. For one, when the duct is formed to change the direction of fluid flow, sharp corners are present in the duct walls so that changes in the direction of the fluid flow will be abrupt and consequently considerable resistance to flow will be created.

Another disadvantage is that such ducts, because they have large flat areas, cannot withstand high internal pressure without the use of reinforcing members, which add to the cost and often restrict fluid flow. Plates in such ducts are often two thousand square feet in area and in internal pressure of say 7 psi will mean that the pressure load on a plate of this size will be in the order of a thousand tons. The pressure load resolves into flexural or bending stress in the plates so that the plates which may be one-fourth inch or three-eighths inch steel will often fail. Even if the plates do not fail, the outward bowing of the plates caused by the internal pressure will often work the seams enough to rupture them.

Another disadvantage of large ducts made of flat plates is that the plates vibrate considerably especially at high flow rates. This phenomenon is noisy and deleterious.

To reinforce the plates against the internal fluid pressure and excessive vibration, it is customary to provide reinforcement structure. It is usually positioned within the duct because less structure is required than if the structure were provided exteriorly and also because exterior structure would require too much additional space.

The interior reinforcement structure inhibits fluid flow so that larger ducts are required. It also adds to the expense of fabrication.

SUMMARY OF THE INVENTION

It is an object of the present invention to overcome drawbacks found in the prior art such as those discussed above. Accordingly, ducts for conveying large quantities of fluid are made up of plates, each of which is curved or bowed to reinforce the ducts from vibration and internal pressure without the provision of reinforcing structure and to prevent the creation of excessive resistance to fluid flow.

BRIEF DESCRIPTION OF THE DRAWINGS

FIG. 4 is a perspective fragmentary view showing a straight section of duct work made in accordance with the present invention; and FIG. 5 is a perspective view of contiguous venturi sections in duct work made in accordance with the present invention.

DETAILED DESCRIPTION OF THE PREFERRED EMBODIMENT

Figure 1:
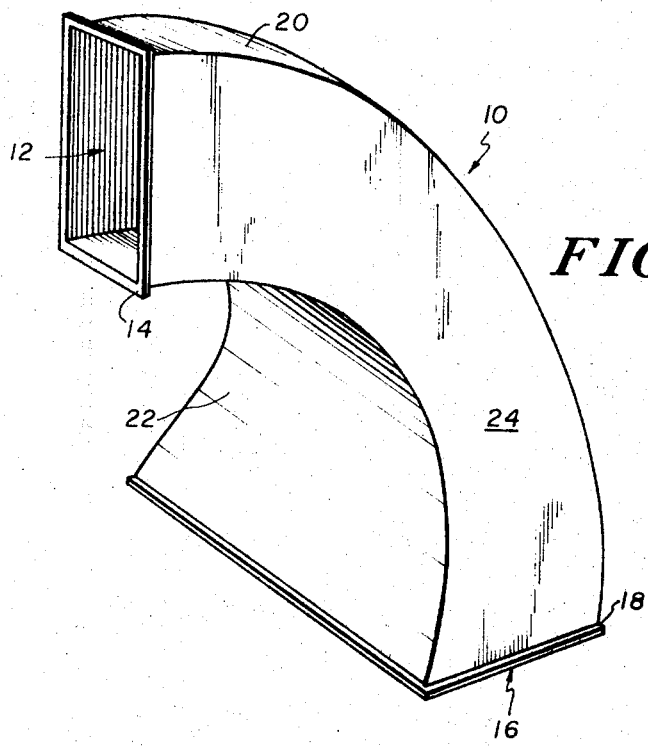
FIG. 1 is a perspective view of a curved section of duct made in accordance with the present invention.

There is shown in FIG. 1, a section of duct work indicated generally as 10. The section 10 is one which conveys fluid along a curved path while changing the fluid stream in cross-sectional area. An open end 12 defined by a rectangular frame 14 is perpendicular to an other end 16 which is defined by a rectangular frame 18. The open ends 12, 16 are at right angles to one another and are each rectangular in cross-section. The end 16 has considerably more cross-sectional area than the end 12.

Figure 2:
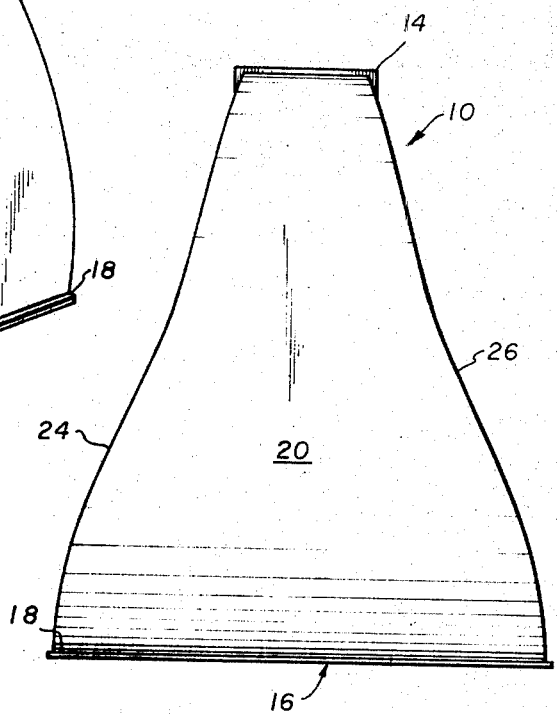
FIG. 2 is a rear view of the section of the duct shown in FIG. 1.
Figure 3:
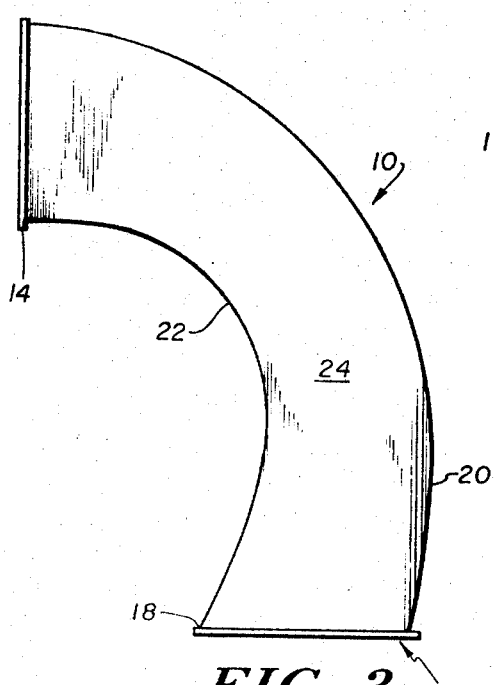
FIG. 3 is a side view of the section of the duct shown in FIG. 1.

The section 10 has an outer curved plate 20 and an inner curved plate 22 which are more or less parallel to each other and extend between the frames 14 and 18. Plates 20 and 22 are joined at their sides by plates 24 and 26 which are also curved over their entire length as shown in FIG. 2 so that they smoothly join the sides of the plates 20 and 22 and smoothly join the frames 14 and 18.

Fluid being conveyed through the section 10 will not experience any abrupt change in velocity or direction. Further, the fact that the four panels from which the section 10 is made are each curved over their entire length reinforces the section against vibration and against internal pressure to obviate the use of reinforcing members, or at least decrease the size and/or number of such members.

The substitution of curved plates for flat plates results in a duct where the plates resist the internal pressure primarily in compression or tension rather than bending. The plates react similarly to a cylindrical section so that if they are bowed away from the fluid, they go into tension and if they are bowed toward the fluid, they go into compression. Moreover, it has been found that the largest component of tension or compression is in the plate of greatest curvature so that the stress in the plates is more or less a "hoop stress."

An end portion of straight section 100 of conduit made in accordance with the present invention is shown in FIG. 4. The straight section 100 includes four plates 102, 104, 106, 108. The plates 102 and 104 are joined at a seam 110 while the panels 104 and 106 are joined at seam 112. The panels 106 and 108 are joined at a seam 114 while the plates 108 and 102 are joined at a seam 116. Each of the panels 102, 104, 106, 108 are bowed outwardly along its length so that the cross-sectional profile of each of the panels will be similar throughout the length thereof. The outward bow of the panels reinforces the duct section 110 against internal pressure and prevents the creation of excessive vibration due to the fluid being conveyed therethrough.

It has been found that when under internal pressure, the section 110 is under tension at each of the plates 102, 104, 106, 108. There is little bending stress and the tension is principally along planes which are perpendicular to the longitudinal axis of the section 110. In other words, the main stress is in the nature of a "hoop stress." Tension in a direction perpendicular to the longitudinal axis of the section 110 has been found to be only a small fraction of the tension parallel to the longitudinal axis. Thus, there will be little stress on the seams connecting a plurality of straight sections 110 when joined end to end and the sections 110 will themselves withstand considerable internal pressure because the forces acting on the section will be resolved primarily into tensile stress.

The section 100 of the duct is provided at its ends with beams 120, 122, 124, 126 which conform to the contour of plates 102, 104, 106, 108 respectively. Each of the beams may be joined at its ends to the two beams adjacent to it so that the section 100 is in effect encircled by a continuous beam at one or both of its ends. The beams have several purposes. They hold the plates in proper contour, especially during fabrication and they permit the section 110 to be joined to the appropriate supporting structure. The provision of bulky reinforcing structure interiorly of the section 110 has been obviated by the use of bowed plates 102, 104, 106, 108 rather than conventional flat plates.

FIG. 5 shows a segment of duct indicated generally as 200 having two integral venturies. The section 200 is made up of three sections 202, 204, 206. The sections 202 and 204 are joined at a seam 208, while the sections 204 and 206 are joined at a seam 210. Each of the seams 208 and 210 are generally rectangular in shape.

The section 202 is made up of four plates 212, 214, 216, 218 each of which is bowed outwardly and joined to its two adjacent plates at curved seams.

The section 204 comprises four plates each of which is bowed outwardly. A front plate 222 is joined at its sides to two side plates, only one of which 224 is shown, the other being on the obscured side of the duct section. A rear plate, not shown, is identical to the front plate 222 in shape and contour.

The lowermost section 206 is made up of four plates which are bowed inwardly so that the section 206 has a narrow portion 230 between its ends. The front plate 226 and side plate 228 are shown, it being understood that the other side plate is identical to the side plate 228 and the rear plate is identical to the front plate 226.

When fluid is flowed through the section 200, the internal pressure is the smallest at locations adjacent to the seam 208 and the narrow portion 230 of the section 206 because of the venturi effect. For the same reason, the internal pressure is relatively high at locations of the sections 202 and 204 of comparatively large cross-sectional area and at the upper and lower portions of the section 206.

It was found that little flexural stress resulted in the plates which made up the section 200. Sections 202 and 204 were in tension with the greatest stress at each point substantially parallel to the longitudinal axis of the section 200. They were actually in the planes of greatest curvature so that at the side marginal portions of the sections 202 and 204 they were more or less parallel to the sides of those plates. Tensions perpendicular to the planes of greatest curvature were only a small fraction of the tension parallel thereto. In other words, the plates of the portions 202 and 204 acted pretty much like sections of cylinders under internal pressure.

The plates of portion 206 on the other hand went into compression with the greatest stress at each point in the plane of greatest curvature. The perpendicular component was only a small fraction of this stress. In effect, the plates of section 206 are acted upon like a portion of a cylinder under external pressure.

Each of the sections of duct described above can be fabricated of flat plates which can be shipped feasibly to a construction site. The plates are shaped at the site and joined as by welding to other plates which are contoured at the site. Preferably, the plates are bowed so that at any point they are bowed in only one direction, that is they are bent about a straight line of bend passing through that point. In this way, it is not necessary to stretch or compress the plates. In each of the sections of duct described, the lines of bend are parallel. This arrangement has been found to be most effective in preventing the retention of any flat surfaces in the plates.

What is claimed is:

1. A straight section of a large fluid duct comprising a plurality of plates, each of said plates being joined to two adjacent plates of said plurality of plates at its side edges to form seams, each of said plates being bowed outwardly so that the surface of said plates is defined by a series of parallel straight lines each of which is parallel to the longitudinal axis of the said section so that the stress at any point on one said lines when said duct contains fluid under pressure will be a tension stress with the greatest component in a direction perpendicular to said line, said section further comprising a plurality of curved beams with each beam engaging along the length thereof one of said plates on the exterior surface thereof adjacent to an end of said section, said beams extending perpendicular to said axis to reinforce said section and to provide means to secure said section to appropriate supporting structure.

* * * * *